US012683995B2

(12) United States Patent
Avula et al.

(10) Patent No.: US 12,683,995 B2
(45) Date of Patent: Jul. 14, 2026

(54) EXPLICIT PROXY INLINE SECURITY

(71) Applicant: Palo Alto Networks, Inc., Santa Clara, CA (US)

(72) Inventors: Raghavaiah Avula, San Jose, CA (US); Arivu Mani Ramasamy, San Jose, CA (US); Ketul Sheth, San Jose, CA (US); Donna Grace Prince, Dublin, CA (US); Bipin Ramasare Dubey, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 49 days.

(21) Appl. No.: 18/897,911

(22) Filed: Sep. 26, 2024

(65) Prior Publication Data

US 2026/0089180 A1     Mar. 26, 2026

(51) Int. Cl.
*H04L 9/40*          (2022.01)

(52) U.S. Cl.
CPC ...... *H04L 63/1425* (2013.01); *H04L 63/0236* (2013.01); *H04L 63/1491* (2013.01)

(58) Field of Classification Search
CPC ............. H04L 63/1425; H04L 63/0236; H04L 63/1491
See application file for complete search history.

(56) References Cited

U.S. PATENT DOCUMENTS

| | | | |
|---|---|---|---|
| 2013/0103834 A1* | 4/2013 | Dzerve | H04L 67/10 |
| | | | 709/225 |
| 2020/0304524 A1* | 9/2020 | Weinberger | H04L 63/1425 |
| 2022/0217121 A1* | 7/2022 | Devarajan | H04L 67/10 |
| 2022/0222586 A1* | 7/2022 | Koda | G06N 3/04 |
| 2024/0333747 A1* | 10/2024 | Parla | G06F 16/334 |
| 2025/0005151 A1* | 1/2025 | Parmar | H04L 63/1416 |
| 2025/0175456 A1* | 5/2025 | Crabtree | G06F 16/909 |
| 2025/0254197 A1* | 8/2025 | Rosomakho | H04L 63/1416 |
| 2025/0330491 A1* | 10/2025 | Tong | H04L 63/1466 |
| 2025/0337755 A1* | 10/2025 | Sathya Moorthy | |
| | | | H04L 63/1416 |
| 2025/0337758 A1* | 10/2025 | Hu | G06N 3/08 |
| 2025/0337762 A1* | 10/2025 | Keisar | H04L 63/1408 |
| 2025/0337773 A1* | 10/2025 | Deng | H04L 63/145 |
| 2025/0343814 A1* | 11/2025 | Chen | H04L 63/1425 |
| 2025/0350628 A1* | 11/2025 | Murphy | H04L 63/1416 |
| 2025/0365308 A1* | 11/2025 | Rubin | H04L 41/16 |
| 2025/0371153 A1* | 12/2025 | Valluri | G06F 21/564 |
| 2025/0379888 A1* | 12/2025 | Danino | G06F 16/955 |
| 2025/0392542 A1* | 12/2025 | Zhang | H04L 45/38 |
| 2026/0006074 A1* | 1/2026 | Mohamed Nabeel | |
| | | | H04L 63/1483 |

* cited by examiner

*Primary Examiner* — Stephen T Gundry
(74) *Attorney, Agent, or Firm* — Van Pelt, Yi & James LLP

(57)          ABSTRACT

A plurality of logs for a cloud security service for a plurality of tenants are captured. A network traffic pattern associated with the plurality of logs is analyzed and a security related impact analysis is determined. An action is performed based on the security related impact analysis.

20 Claims, 5 Drawing Sheets

200

Capture A Plurality Of Logs
For A Cloud Security Service
For A Plurality Of Tenants       202

Analyze Network Traffic
Pattern       204

Determine A Security Related
Impact Analysis       206

Perform An Action Based On
The Security Related Impact
Analysis       208

300

Access A Plurality Of Logs — 302

Detect An Anomaly — 304

Generate An Alert — 306

Perform One Or More Mitigation Steps — 308

500

EXPLICIT PROXY INLINE SECURITY

BACKGROUND OF THE INVENTION

A proxy receives access requests for an entity from a plurality of different sources. Some of the access requests are benign while some of the access requests may be malicious. Due to their public-facing nature, a proxy is susceptible to distributed denial of service (DDoS) attacks where attackers overwhelm the proxy with a flood of activity, disrupting its normal operation and potentially causing service outages.

Attackers may abuse public proxies for various malicious activities, such as sending spam emails, conducting brute-force attacks, or distributing malware. This can tarnish the reputation of the proxy service and lead to its blacklisting by legitimate organizations. Furthermore, proxies that perform SSL/TLS termination and inspection may be vulnerable to attacks targeting cryptographic weaknesses, certificate validation errors, or protocol vulnerabilities, potentially leading to data interception or manipulation. Moreover, weak or misconfigured authentication mechanisms in public-facing proxies can be exploited by attackers to gain unauthorized access and abuse the proxy for malicious purposes. Additionally, attackers may chain multiple public proxies together to obfuscate their origins and evade detection, making it challenging for defenders to track and block malicious traffic. Also, attackers may exploit vulnerabilities in content filtering mechanisms deployed in public proxies to bypass restrictions and access restricted or malicious content. In addition, public-facing proxies may inadvertently leak sensitive information, such as user credentials, session tokens, or Personally Identifiable Information (PII), due to misconfigurations or implementation flaws. Lastly, attackers may inject malicious code or payloads into web traffic passing through public proxies, targeting vulnerable client devices or backend systems connected to the proxy infrastructure.

BRIEF DESCRIPTION OF THE DRAWINGS

Various embodiments of the invention are disclosed in the following detailed description and the accompanying drawings.

DETAILED DESCRIPTION

Figure 1:
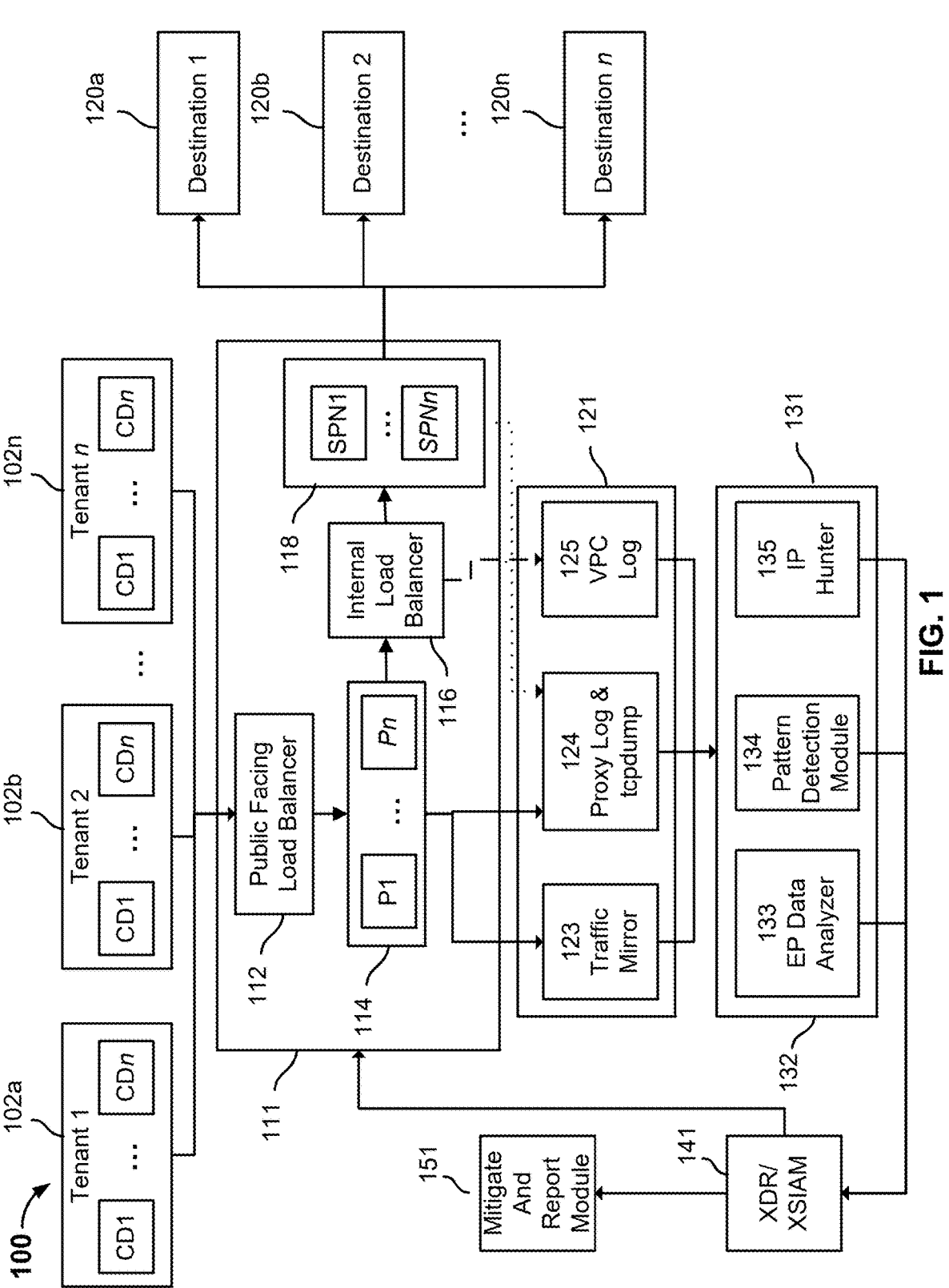
FIG. 1 is a block diagram illustrating a system to mitigate risks for a proxy in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Systems and methods to mitigate risks for a proxy are disclosed herein. An organization may implement one or more security policies to prevent a malicious actor from gaining unauthorized access to one or more resources (e.g., files, networked devices, a data center, a software as a service (SaaS), the Internet, etc.). However, an administrator may accidently configure the one or more security policies to be too lenient, potentially enabling one or more malicious actors to gain unauthorized access to the one or more resources. Furthermore, the administrator may implement two or more security policies that accidentally conflict with each other. For example, a first security policy may indicate a particular port is closed on a networked device. A second security policy may indicate the particular port is open on the networked device. The second security policy is executed after the first security policy. As a result, the particular port may be open to one or more malicious actors even though it was the intent of the administrator for the particular port to be closed.

FIG. 1 is a block diagram illustrating a system to mitigate risks for a proxy in accordance with some embodiments. In the example shown, system 100 includes a first tenant 102a, a second tenant 102b, . . . , and an nth tenant 102n. An example of a tenant is an organization, an enterprise, a government, a business, an institution, etc. For example, first tenant 102a may be a first organization, second tenant 102b may be a second organization, . . . and nth tenant 102n may be an nth organization. Another example of a tenant is a sub-group within an organization. For example, first tenant 102 may correspond to an engineering group, second tenant 102b may correspond to a sales group, . . . , and nth tenant 102n may correspond to a human resources group.

Although FIG. 1 depicts three tenants, system 100 may include 1:n tenants. Each of the tenants 102a, 102b, . . . , 102n is associated with a corresponding set of client devices (CD). A tenant may be associated with 1: n client devices. A client device may be a computer, a server, a mobile device, a virtual machine, a container, a laptop, a smartphone, a tablet, networking equipment, a gaming console, a smart device, or any other electronic device having a communication identifier (e.g., MAC address, IP address).

System 100 includes a capture layer 111 that is comprised of a public facing load balancer 112, one or more proxies 114, an internal load balancer 116, and a plurality of security processing nodes 118.

Public facing load balancer is configured to receive a corresponding request from any of the client devices associated with tenants 102a, 102b, . . . , 102n and provide the corresponding request to one of the one or more proxies 114. Although two proxies are shown, system 100 may include 1:n proxies. A proxy may be a proxy server, a software proxy, or a network service. In some embodiments, public facing load balancer is optional and system 100 includes a single proxy.

Proxy 114 is configured to receive a corresponding request from any of the client devices associated with tenants 102a, 102b, . . . , 102n and forward the corresponding request to internal load balancer 116. The corresponding request is also captured in traffic mirror 123 and proxy log & tcpdump 124.

System 100 includes a plurality of security processing nodes 118. Internal load balancer 116 is configured to capture the request in virtual private cloud (VPC) log 125 and provide the corresponding request to one of the security processing nodes (e.g., a firewall). Although two security processing nodes are shown, system 100 may include 1:n security processing nodes. A security processing node is a specialized hardware or software component configured to hand security-related tasks, such as traffic inspection, encryption, threat detection, and mitigation, in a network. A security processing node may monitor and analyze network traffic in real-time to detect malicious activity, suspicious patterns, or protocol violations. A security processing node may use predefined security policies, machine learning, and/or signature-based detection methods to identify potential threats, such as viruses, malware, intrusions, or denial-of-service attacks. A security processing node may enforce security policies based on an organization's defined rules. The security processing node can block certain traffic, quarantine suspicious files, or trigger alerts when a potential threat is detected. The security processing node may be included in a firewall, a next-generation security device, or a cloud and data center to monitor and secure traffic between virtual machines, containers, or microservices.

In response to receiving a request, the security processing node that receives the request captures the request in proxy log & tcpdump 124 and forwards the request to one of the destinations 120a, 120b, . . . , 120n. A destination may be a website on the Internet, a device in a datacenter (e.g., server, networking equipment, storage system, etc.), a Software as a Service (SaaS) platform, etc. There may be one or more intervening devices (not shown) that receive a request from one of the security processing nodes 118 and forward the request to its intended destination.

System 100 includes a collection layer 121 that is comprised of traffic mirror 123, proxy log & tcpdump 124, and VPC log 125. Traffic mirror 123 is configured to duplicate the network traffic received from one of the one or more proxies 114 and provide the duplicated network traffic to analysis layer 131 that is comprised of data analyzer 133, pattern detection 134, and IP hunter 135.

Proxy log & tcpdump 124 is configured to provide a proxy log that provides information about service-to-service communication, such as request paths, response statuses, traffic volumes, and traffic details. The traffic details may include a source and destination IP address, HTTP request methods, HTTP request codes, request and response headers, latency or time taken to process the request, etc.

Tcpdump is a command line network packet analyzer configured to capture and display network traffic going through system 100. Tcpdump is configured to capture packets at the data link layer (e.g, Layer 2 of the OSI model) and display detailed information about each packet, such as source and destination IP addresses, protocols used, port numbers, and payload data.

VPC log 125 is configured to receive network traffic from internal load balancer 116. VPC log 125 is configured to capture information about the IP traffic going to and from network interfaces in a VPC. The captured information may include source IP address, destination IP address, source port, destination port, protocol, traffic direction (e.g., inbound or outbound), traffic volume (amount of data transferred in packets and bytes), accept/reject status, etc.

In some embodiments, collection layer 121 includes a firewall log (not shown). The firewall log provides information associated with network traffic that is allowed or blocked by security policies, providing visibility into potential threats and suspicious activities. The firewall log may include a timestamp associated with an event, a source IP address of the device that initiated the network connection, a destination IP address of the device or service that the connection was trying to reach, a source port, a destination port, a protocol used (e.g., TCP, UDP, or ICMP), an action taken by the firewall (e.g., allow, block, drop, or reject), a log message or description, a rule ID or name that triggered the log entry, the amount of data transferred in the connection, and/or a connection status (e.g., completed, failed, or reset).

System 100 includes an analysis layer 131. Analysis layer 131 includes explicit proxy (EP) data analyzer 133, pattern detection module 134, and IP hunter 135.

EP data analyzer 133 is configured to perform intrusion detection and prevention (IDP) to protect networks from a wide range of threats. Each of the tenants 102a, 102b, . . . , 102n is associated with a corresponding EP data analyzer 133. EP data analyzer 133 uses a combination of signature-based detection, protocol analysis, and behavioral analysis to identify and block malicious traffic. EP data analyzer 133 is configured to analyze the traffic associated with one of the tenants 102a, 102b, . . . , 102n, however, EP data analyzer 133 stores the IP addresses for all known client devices associated with tenants 102a, 102b, . . . , 102n. Based on an IP address associated with a client device, EP data analyzer 133 may determine that network traffic associated with the client device is associated with one or more different tenants than the tenant to which the EP data analyzer 133 is protecting. For example, EP data analyzer 133 is associated with a first tenant. EP data analyzer 133 may determine that network traffic is received from a client device associated with a second tenant where the client device has a first IP address. Later, EP data analyzer 133 may determine that network traffic received from a client device associated with a third tenant has the first IP address. In response to determining that network traffic is received from a client device associated with a threshold number of tenants (e.g., 10) where the client device has the same IP address, EP data analyzer 133 is configured to add the IP address to a blacklist of IP addresses.

Pattern detection module 134 is configured to a plurality of data models to analyze the logs (e.g., proxy log, VPC log, firewall log, data lake, etc.), metrics, and packet capture to detect malicious, suspect, or configuration/infrastructure level issues and recommendations. In some embodiments, pattern detection module 134 utilizes machine learning to recognize patterns and anomalies in network traffic that may indicate malicious activity. Pattern detection module 134 may utilize supervised and/or unsupervised machine learning models to analyze network traffic patterns. Pattern detection module 134 may monitor and profile typical network behavior, identifying deviations indicative of threats. Pattern detection module 134 is configured to provide contextual information about detected threats, helping analysts understand the nature and severity of the threat.

In some embodiments, pattern detection module 134 provides tenant-specific analysis. For example, pattern detection module 134 may establish baseline patterns for each specific tenant by analyzing historical network traffic. Pattern detection module 134 may detect deviations from established baselines for a specific tenant, indicating potential security incidents. Patten detection module 134 may continuously monitor network traffic, comparing it against the baseline to detect anomalies. Pattern detection module 134 may compare detected patterns with those of similar tenants to identify broader trends or common threats.

In some embodiments, pattern detection module 134 performs threat detection. For example, pattern detection module 134 may identify known and unknown malware by analyzing the behavior and characteristics of network packets. Pattern detection module 134 may identify malware by matching network traffic against known malware signatures. Pattern detection module 134 may identify malware based on behavioral indicators, such as unusual process execution or abnormal network connections. Pattern detection module 134 may flag unusual or suspicious activities, such as data exfiltration or lateral movement within the network. Pattern detection module 134 may utilize statistical methods and anomaly detection algorithms to flag unusual activities. Pattern detection module 134 may correlate network events with threat intelligence feeds to identify suspicious activities. Pattern detection module 134 may integrate a common vulnerabilities and exposures (CVE) database to detect vulnerabilities and exploit attempts associated with specific CVEs. Pattern detection module 134 may cross-reference traffic patterns and payloads with known CVEs. Pattern detection module 134 may identify exploit attempts by detecting specific patterns associated with known vulnerabilities.

Pattern detection module 134 may identify open ports on network devices and assess their security implications. Pattern detection module 134 may conduct network port scans to identify open ports on devices. Pattern detection module 134 may utilize service fingerprinting techniques to identify the type of service running on the open ports. Pattern detection module 134 may assess the security implications of open ports by checking for outdated or misconfigured services.

In some embodiments, pattern detection module 134 generates and provides comprehensive reporting. For example, pattern detection module 134 may generate detailed reports on the findings, including the types of threats detected, affected systems, and recommended actions. Pattern detection module 134 may provide visual representations of network traffic, highlighting anomalies and potential threats.

In some embodiments, pattern detection module 134 generates configuration recommendations. For example, pattern detection module 134 may provide recommendations for security policy changes to address detected issues. Pattern detection module 134 may suggest best practices for securing open ports and mitigating vulnerabilities.

In some embodiments, pattern detection module 134 integrates with security tools. For example, pattern detection module 134 may work seamlessly with a security platform that provides extended and response (XDR) capabilities. Pattern detection module 134 may be integrated with an extended security orchestration, automation, and response (XSOAR) platform to automate response actions based on the analysis results.

IP hunter 135 includes a honeypot cluster comprised of a plurality of computing resources. Each of the tenants 102a, 102b, . . . , 102n is associated with a corresponding IP hunter 135. The honeypot cluster has a default policy of "deny all" to prevent any attempts to access the honey pot cluster. In response to an IP address being added to the blacklist, IP hunter 135 is configured to enable the honeypot cluster and make the honeypot cluster publicly accessible. IP hunter 135 is configured to log information associated with the honeypot cluster access and provide the information associated with the honeypot cluster access to XDR/XSIAM 141. The information associated with the honeypot cluster access may include details such as source IP, destination sites, and ports.

IP hunter 135 is configured to run a server every 24 hours or other duration to get a list of IP addresses collected in the last 24 hours or since a previous check. The IP addresses included in the list are checked to see if they are not present in the global honeypot list and the global external dynamic list. In response to a determination that they are not present on either list, the one or more new IP addresses are added to the global honey pot list and the global external dynamic list.

IP hunter 135 is configured to add the one or more new IP addresses to all explicit proxy tenants' VPCs with a block rule. IP hunter 135 is configured to push the latest EDL list to all proxy load balancers to ensure the block list category is up-to-date.

XDR/XSIAM 141 is configured to process the logs and collect unique IP addresses attempting to access the honeypot cluster. The IP addresses may be collected according to a schedule (e.g., hourly, daily, etc.). In some embodiments, XDR/XSIAM 141 collects IP addresses directly from VPC log 125. XDR/XSIAM 141 is configured to apply subnet filtering to identify IP addresses common across all tenants based on region.

In some embodiments, XDR/XSIAM 141 includes a data lake (not shown) storing security-related data, such as logs and alerts, from multiple sources like firewalls, endpoint protection, and other network security tools.

XDR/XSIAM 141 is configured to integrate logs for comprehensive analysis. The logs may includes a proxy log, a VPC log, a firewall log, and/or a data lake that aggregates and normalizes log data from diverse sources, allowing XDR/XSIAM 141 to analyze and correlate information to detect anomalies and threats.

XDR/XSIAM 141 is configured to detect and mitigate against DDoS attacks. DDoS attacks overwhelm a network or service with a flood of traffic, causing disruptions. XDR/XSIAM 141 utilizes machine learning and behavioral analytics to identify signs of a DDoS attack. XDR/XSIAM 141 monitors traffic volumes and patterns. Anomalies such as a sudden spike in requests or traffic from a single IP address are flagged as potential indicators of a DDoS attack. By analyzing a proxy log, XDR/XSIAM 141 identifies unusual request patterns or response statuses that deviate from the norm.

For example, a sample log entry may be:

```
{
    "timestamp": "2024-08-04T16:00:00Z:,
    "source_ip": "203.0.113.5",
    "destination_ip": "10.0.0.10",
    "request_path": "/api/resource",
    "response_status": "200",
    "bytes_sent": 1024,
    "bytes_received": 2048,
    "protocol": HTTP"
}
```

In this example, XDR/XSIAM 141 has detected an anomaly having a source IP address of "203.0.113.5." The anomaly is excessive requests per second from a single IP address. The alert generated by XDR/XSIAM 141 is "Potential DDoS attack detected from source IP 203.0.113.5".

Mitigate and Report Module 151 is configured to implement one or more mitigation steps based on an output of XDR/XSIAM 141.

For example, mitigate and report module 151 may implement rate limiting rules in the proxy to throttle traffic from a suspicious IP address. Mitigate and report module 151 may update firewall policies to block traffic from the source IP or subnet associated with the DDoS attack.

In another example, a sample log entry may be:

```
{
    "timestamp": "2024-08-04T16:00:00Z:,
    "source_ip": "198.51.100.15",
    "destination_ip": "10.0.0.10",
    "request_path": "/api/login",
    "response_status": "500",
    "bytes_sent": 512,
    "bytes_received": 256,
    "protocol": HTTP"
}
```

In this example, XDR/XSIAM 141 has detected an anomaly having a source IP address of "198.51.100.15". XDR/XSIAM 141 may detect the anomaly as repeated failed login attempts resulting in a "500 Internal Server Error". XDR/XSIAM 141 may generate an alert "Suspicious login attempts detected from source IP 198.51.100.15". In response to the alert, mitigate and report module 151 may implement a policy in the firewall to block a malicious IP address. Mitigiate and report module 151 may adjust proxy settings to restrict access to sensitive endpoints or apply authentication measures.

Figure 2:
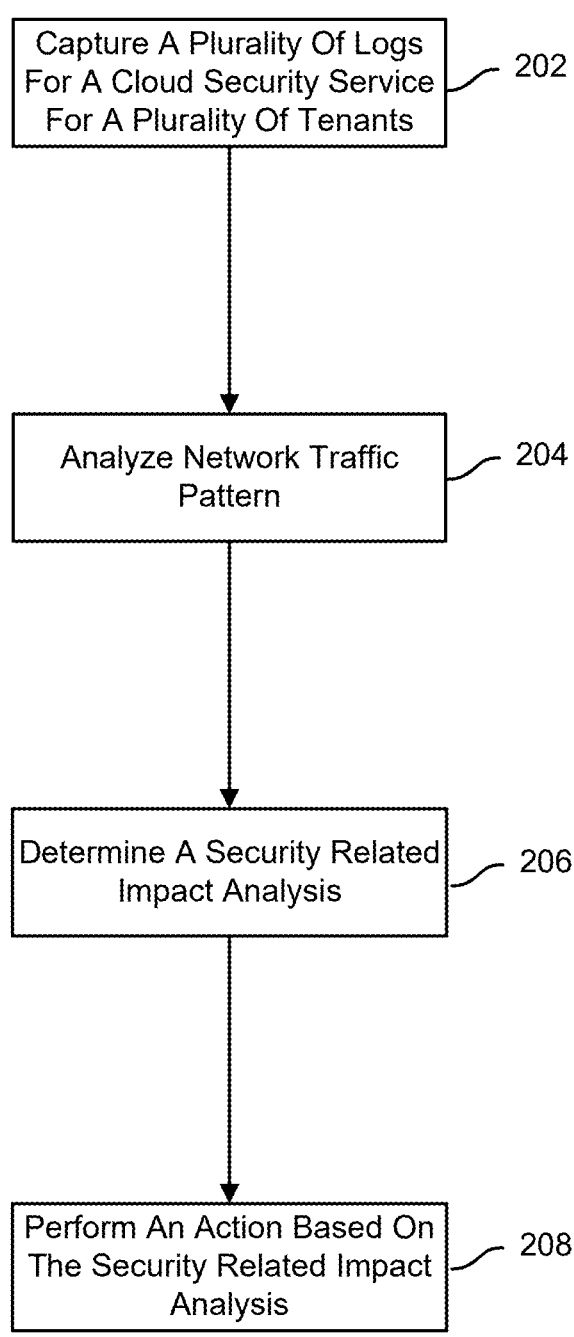
FIG. 2 is a flow diagram illustrating a process to mitigate risks for a proxy in accordance with some embodiments.

FIG. 2 is a flow diagram illustrating a process to mitigate risks for a proxy in accordance with some embodiments.

At 202, a plurality of logs for a cloud security service for a plurality of tenants is captured. The plurality of logs may include a proxy log, a VPC log, a firewall log, and/or a data lake that aggregates and normalizes log data from diverse sources.

At 204, based on the plurality of logs, a network traffic pattern is analyzed using an analysis layer. The network traffic pattern is analyzed by an analysis layer. The analysis layer may include an EP data analyzer, an IP address hunter, and/or an pattern detection module.

The EP data analyzer is configured to utilize machine learning and/or behavioral analytics to identify signs of a DDoS attack. The EP data analyzer may monitor traffic volumes and patterns. Anomalies such as a sudden spike in requests or traffic from a single IP address (across multiple tenants) may be flagged as potential indicators of a DDoS attack. The EP data analyzer may analyze the logs to identify unusual request patterns or response statuses that deviate from the norm.

The IP address hunter deploys a honeypot cluster that is publicly accessible, respective to the compute region based on user traffic. The honey pot cluster may be deployed after a single IP address is flagged, or after unusual request patterns or unusual response status are identified. The IP address hunter collects all unique IP addresses attempting to access the honeypot cluster on an hourly basis or other interval (e.g., every 30 mins, every 4 hours, every 6 hours, etc.).

The pattern detection module utilizes machine learning to recognize patterns and anomalies in network traffic that may indicate malicious activity.

At 206, a security related impact analysis is determined. The pattern detection module provides contextual information about detected threats, helping analysts understand the nature and severity of a threat. The pattern detection module also generates detailed reports on the findings, including the types of threats, affected systems, and recommended actions.

At 208, an action is performed based on the security related impact analysis.

In some embodiments, IP addresses detected by the honeypot cluster are added to a global honeypot list and a external dynamic list. The EDL is pushed to all load balancers to ensure the block list category is up-to-date.

The pattern detection module is configured to generate a detailed report that summarizes the findings and provides recommendations for further investigation or remediations. The recommendations may include security policy changes to address the detected issues. The recommendations may also suggest best practices for securing open ports and mitigating vulnerabilities.

Figure 3:
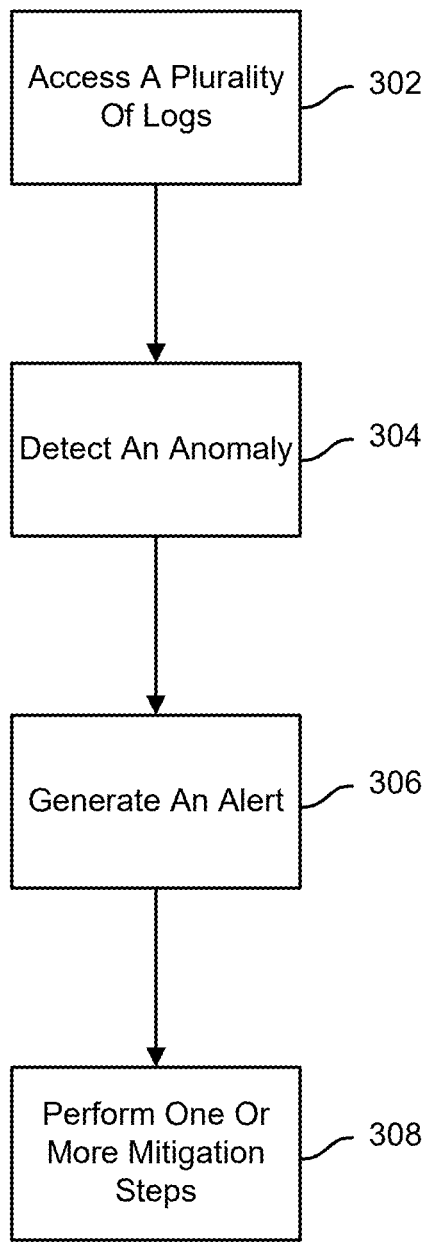
FIG. 3 is a flow diagram illustrating a process to analyze a network traffic pattern in accordance with some embodiments.

FIG. 3 is a flow diagram illustrating a process to analyze a network traffic pattern in accordance with some embodiments. In the example shown, process 300 may be implemented by an EP data analyzer, such as EP data analyzer 133. In some embodiments, process 300 is implemented to perform some or all of step 204 of process 200.

At 302, a plurality of logs are accessed. The plurality of logs may include a proxy log, a VPC log, a firewall log, etc.

At 304, an anomaly is detected. A sudden spike in requests or traffic from a single IP address may be flagged as a potential indicator of a DDoS attack. By analyzing the logs, unusual request patterns or response statuses that deviate from the norm may be identified.

In some embodiments, deviations in traffic patterns that may indicate scanning or exploitation attempts are identified. Observed traffic may be cross referenced with threat intelligence feeds and historical attack patterns.

At 306, an alert is generated.

At 308, one or more mitigation steps are performed. In some embodiments, rate limiting rules are implemented in a proxy to throttle traffic from a suspected IP address. In some embodiments, firewall policies are updated to block traffic from the source IP or subnet associated with the DDoS attack.

In some embodiments, a policy in the firewall to block the malicious IP address is implemented. In some embodiments, proxy settings are adjusted to restrict access to sensitive endpoints or apply authentication measures.

Figure 4:
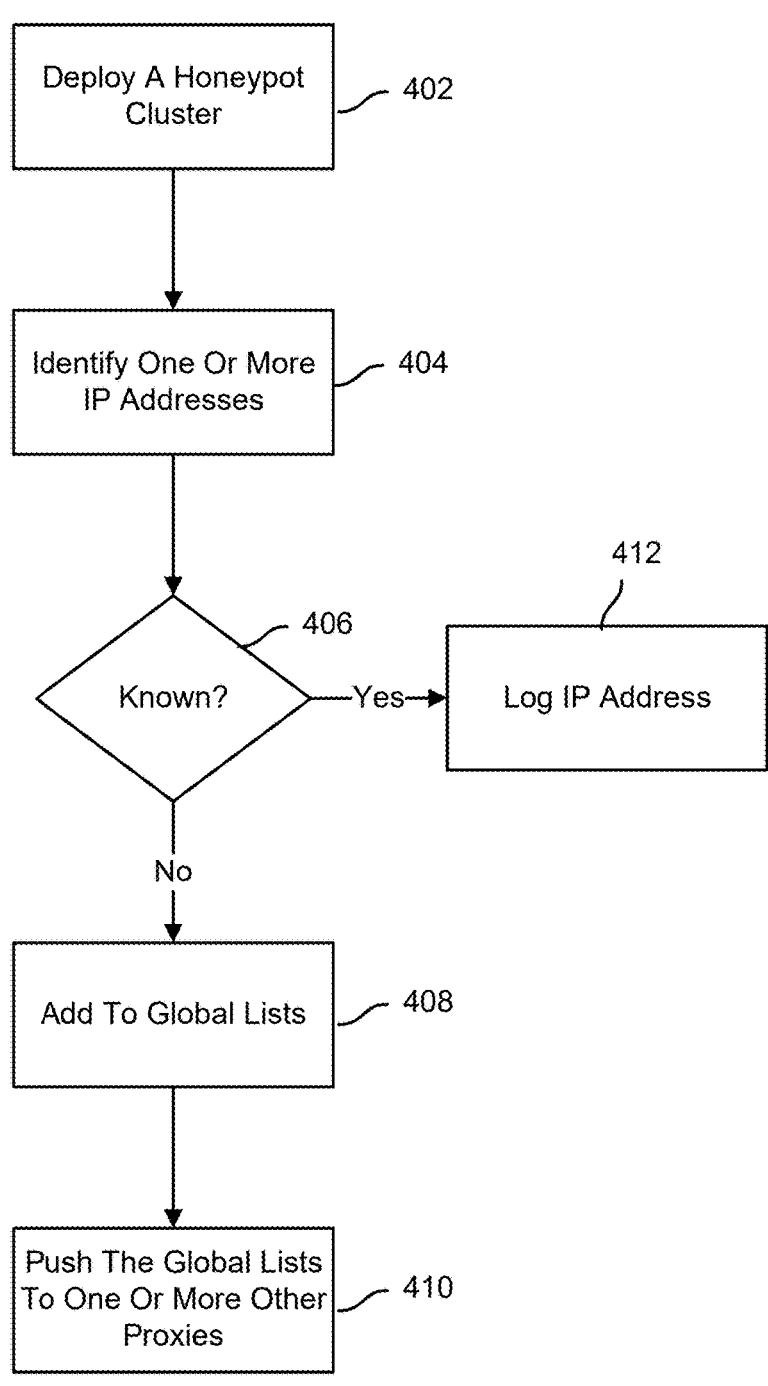
FIG. 4 is a flow diagram illustrating a process to analyze a network traffic pattern in accordance with some embodiments.

FIG. 4 is a flow diagram illustrating a process to analyze a network traffic pattern in accordance with some embodiments. In the example shown, process 400 may be implemented by an IP hunter, such as IP hunter 135. In some embodiments, process 400 is implemented to perform some or all of step 204 of process 200.

At 402, a honeypot cluster is deployed. The honeypot cluster has a default policy of "deny all" to prevent any attempts to access the honey pot cluster. However, after an IP address is determined to be associated with a plurality of different tenants, the policy associated with the honeypot cluster is changed from "deny all" to "allow."

At 404, one or more IP addresses are identified. The honeypot cluster logs a list of IP addresses that attempt to or access the honeypot cluster.

At 406, it is determined whether the one or more identified IP addresses are known. An IP address is known if it is included in a global honeypot list and/or a global external dynamic list.

In response to a determination that an IP address is known process 400 proceeds to 412 where the IP address is ignored because the IP address is already included in the global honeypot list and/or the global external dynamic list.

In response to a determination that an IP address is not already known process 400 proceeds to 408.

At 408, the IP address is added to a global honey pot list and/or a global external dynamic list.

At 410, the global honey pot list and/or the global external dynamic list is pushed to one or more other proxies.

Figure 5:
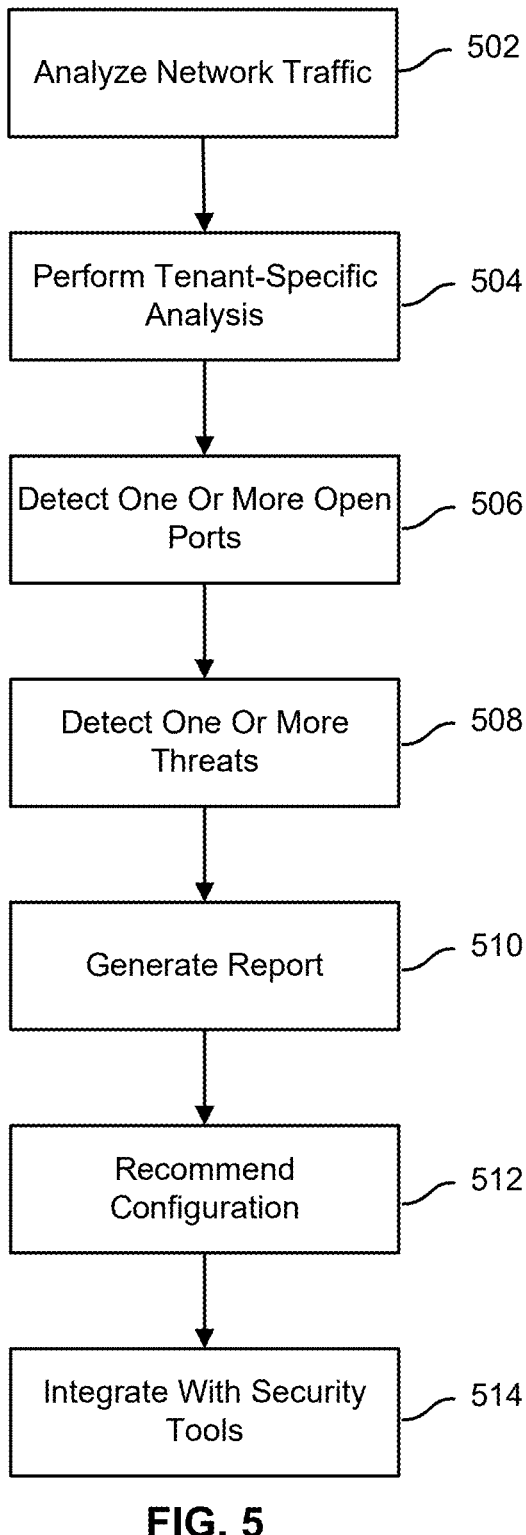
FIG. 5 is a flow diagram illustrating a process to analyze a network traffic pattern in accordance with some embodiments.

FIG. 5 is a flow diagram illustrating a process to analyze a network traffic pattern in accordance with some embodiments. In the example shown, process 500 may be implemented by a pattern detection module, such as pattern detection module 134. In some embodiments, process 500 is implemented to perform some or all of step 204 of process 200.

At 502, network traffic is analyzed.

At 504, tenant-specific analysis is performed. Baseline patterns are established for a specific tenant. Deviations from the baseline patterns are detected, indicating one or more potential security incidents. The detected deviations may e compared with those of similar tenants to identify broader trends or common threats.

At 506, one or more ports are detected. One or more open ports on network devices within the tenant's environment are identified. The security implications of the one or more open ports is assessed.

At 508, one or more threats are detected. Any suspicious activities, such as unusual traffic patterns, connections to known malicious IP addresses, or potential data exfiltration attempts, are flagged. Vulnerabilities and exploit attempts associated with specific CVEs are detected.

At 510, a report is generated. The report may summarize the findings and provide recommendations for further investigation or remediation.

At 512, a configuration is recommended. Recommendations for security policy changes to address detected issues may be provided. Best practices for security open ports and mitigating vulnerabilities may be provided.

At 514, security tools are integrated. The findings may be automatically fed into an XDR for further correlation with other security events. One or more automated response actions can be triggered via XSOAR, such as isolating affected endpoints or blocking malicious IP addresses.

Although the foregoing embodiments have been described in some detail for purposes of clarity of understanding, the invention is not limited to the details provided. There are many alternative ways of implementing the invention. The disclosed embodiments are illustrative and not restrictive.

10

What is claimed is:

1. A method, comprising:
capturing a plurality of logs for a cloud security service for a plurality of tenants;
analyzing a network traffic pattern associated with the plurality of logs and determining a security related impact analysis, wherein the network traffic pattern is analyzed by an explicit proxy data analyzer, wherein analyzing the network traffic pattern includes analyzing the plurality of logs to identify one or more anomalies, wherein an anomaly of the one or more anomalies is a sudden spike in requests or network traffic from a single IP address, wherein the single IP address is associated with a plurality of tenants, wherein a honeypot cluster is deployed in response to the sudden spike in requests or network traffic from the single IP address; and
performing an action based on the security related impact analysis.

2. The method of claim 1, wherein the plurality of logs include at least two of a virtual private cloud log, a proxy log and tcpdump, or a firewall log.

3. The method of claim 1, wherein the one or more anomalies include unusual request patterns or response statuses that deviate from a normal behavior.

4. The method of claim 1, wherein the analyzed network traffic patterns are cross referenced with threat intelligence and historical attack patterns.

5. The method of claim 1, further comprising identifying one or more IP addresses that attempt to access or access the honeypot cluster.

6. The method of claim 5, further comprising determining whether each of the one or more identified IP addresses is a known IP address.

7. The method of claim 6, wherein the known IP address is already included in a global honeypot list and/or a global external dynamic list.

8. The method of claim 6, wherein in response to determining that a first identified IP address is not a known IP address, the method further comprises adding the first identified IP address to a global honeypot list and/or a global external dynamic list.

9. The method of claim 8, further comprising pushing the global honeypot list and/or the global external dynamic list to one or more proxies.

10. The method of claim 1, wherein the action includes implementing rate limiting rules in a proxy, updating firewall rules, and/or updating proxy settings.

11. The method of claim 1, wherein the analyzed network traffic pattern is tenant-specific.

12. The method of claim 11, wherein baseline patterns are established for a specific tenant of the plurality of tenants.

13. The method of claim 12, wherein deviations from the baseline patterns are detected.

14. The method of claim 13, wherein one or more open ports on network devices within the specific tenant's environment are identified.

15. The method of claim 14, wherein the security implications of the one or more open ports is assessed.

16. The method of claim 14, wherein one or more threats are detected.

17. The method of claim 16, wherein the action includes generating a report based on the one or more detected threats.

18. The method of claim 16, wherein the action includes recommending an updated configuration for the specific tenant based on the one or more detected threats.

19. A system, comprising:

a processor configured to:

capturing a plurality of logs for a cloud security service for a plurality of tenants;

analyzing a network traffic pattern associated with the plurality of logs and determining a security related impact analysis, wherein the network traffic pattern is analyzed by an explicit proxy data analyzer, wherein analyzing the network traffic pattern includes analyzing the plurality of logs to identify one or more anomalies, wherein an anomaly of the one or more anomalies is a sudden spike in requests or network traffic from a single IP address, wherein the single IP address is associated with a plurality of tenants, wherein a honeypot cluster is deployed in response to the sudden spike in requests or network traffic from the single IP address; and performing an action based on the security related impact analysis; and a memory coupled to the processor and configured to provide the processor with instructions.

20. A computer program product embodied in a non-transitory computer readable medium and comprising computer instructions for:

capturing a plurality of logs for a cloud security service for a plurality of tenants;

analyzing a network traffic pattern associated with the plurality of logs and determining a security related impact analysis, wherein the network traffic pattern is analyzed by an explicit proxy data analyzer, wherein analyzing the network traffic pattern includes analyzing the plurality of logs to identify one or more anomalies, wherein an anomaly of the one or more anomalies is a sudden spike in requests or network traffic from a single IP address, wherein the single IP address is associated with a plurality of tenants, wherein a honeypot cluster is deployed in response to the sudden spike in requests or network traffic from the single IP address; and performing an action based on the security related impact analysis.

\* \* \* \* \*